United States Patent
Wang et al.

(10) Patent No.: US 11,106,951 B2
(45) Date of Patent: Aug. 31, 2021

(54) METHOD OF BIDIRECTIONAL IMAGE-TEXT RETRIEVAL BASED ON MULTI-VIEW JOINT EMBEDDING SPACE

(71) Applicant: Peking University Shenzhen Graduate School, Shenzhen (CN)

(72) Inventors: Wenmin Wang, Shenzhen (CN); Lu Ran, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate Sohool, Shenzhen (CN)

( * ) Notice: Subject to any disclaimer, the term of this patent is extended or adjusted under 35 U.S.C. 154(b) by 117 days.

(21) Appl. No.: 16/622,570

(22) PCT Filed: Jan. 29, 2018

(86) PCT No.: PCT/CN2018/074408
§ 371 (c)(1),
(2) Date: Dec. 13, 2019

(87) PCT Pub. No.: WO2019/007041
PCT Pub. Date: Jan. 10, 2019

(65) Prior Publication Data
US 2021/0150255 A1 May 20, 2021

(30) Foreign Application Priority Data
Jul. 6, 2017 (CN) .......................... 201710545632.X (51) Int. Cl.
*G06K 9/62* (2006.01)
*G06K 9/72* (2006.01)
(Continued)

(52) U.S. Cl.
CPC .......... *G06K 9/629* (2013.01); *G06F 16/583* (2019.01); *G06F 40/205* (2020.01); *G06F 40/30* (2020.01);
(Continued)

(58) Field of Classification Search
CPC .... G06K 9/629; G06K 9/6215; G06K 9/6228; G06K 9/6256; G06K 9/726;
(Continued)

(56) References Cited

U.S. PATENT DOCUMENTS

2017/0330059 A1* 11/2017 Novotny ............ G06K 9/00664
2018/0373955 A1* 12/2018 Soldevila ............. G06F 16/532

* cited by examiner

*Primary Examiner* — David F Dunphy
(74) *Attorney, Agent, or Firm* — SV Patent Service (57) ABSTRACT

A bidirectional image-text retrieval method based on a multi-view joint embedding space includes: performing retrieval with reference to a semantic association relationship at a global level and a local level, obtaining the semantic association relationship at the global level and the local level in a frame-sentence view and a region-phrase view, and obtaining semantic association information in a global level subspace of frame and sentence in the frame-sentence view, obtaining semantic association information in a local level subspace of region and phrase in the region-phrase view, processing data by a dual-branch neural network in the two views to obtain an isomorphic feature and embedding the same in a common space, and using a constraint condition to reserve an original semantic relationship of the data during training, and merging the two semantic association relationships using multi-view merging and sorting to obtain a more accurate semantic similarity between data.

8 Claims, 3 Drawing Sheets

(51) Int. Cl.
*G06F 40/30* (2020.01)
*G06F 40/205* (2020.01)
*G06F 16/583* (2019.01)
*G06N 3/04* (2006.01)
*G06N 3/08* (2006.01)

(52) U.S. Cl.
CPC ......... *G06K 9/6215* (2013.01); *G06K 9/6228* (2013.01); *G06K 9/6256* (2013.01); *G06K 9/726* (2013.01); *G06N 3/04* (2013.01); *G06N 3/08* (2013.01)

(58) Field of Classification Search
CPC ...... G06F 16/583; G06F 40/205; G06F 40/30; G06N 3/04; G06N 3/08
See application file for complete search history.

Multi-view:
1. A young blonde girl wearing a smile and a bicycle helmet.
2. A smiling young blonde girl wearing a helmet sits in front of her bicycle.
3. A young girl wearing a helmet riding a pony.
4. A little girl with a bike helmet posing by her bicycle.
5. A young blonde girl wearing a helmet sits with a red bicycle behind her.

Frame-sentence view:
1. A young girl wearing a bike helmet with a bicycle in the background.
2. A motor-cross rider trying to catch his bike.
3. A man and his bicycle laying down on the green grass.
4. A man wearing a helmet does a wheelie on a motorcycle as a crowd watches.
5. A woman rides as a bicycle drives pulls her in traffic.

Region-phrase view:
1. A smiling young blonde girl wearing a helmet sits in front of her bicycle.
2. A young blonde girl wearing a smile and a bicycle helmet.
3. A young girl wearing a helmet riding a pony.
4. Small boy and puppy standing in front of a film poster.
5. A girl with arms crossed sitting on a sofa.

Figure 4

METHOD OF BIDIRECTIONAL IMAGE-TEXT RETRIEVAL BASED ON MULTI-VIEW JOINT EMBEDDING SPACE

TECHNICAL FIELD

The present invention relates to the field of computer vision, and specifically, to a method of bidirectional image-text retrieval based on a multi-view joint embedding space, which realizes a bi-directional image-text retrieval task by learning to obtain a multi-view joint embedding space. In this method, the data is observed by utilizing different views, to obtain the semantic association relationship of the data under different granularities, and merged using a multi-view merging and sorting method, to obtain more accurate semantic associations and a more accurate retrieval result.

BACKGROUND OF THE PRESENT INVENTION

With the constant development of research in the field of computer vision, a large number of image-text related tasks, such as ImageCaption, DenseCaption, and VQA (Visual Question Answering), have emerged. These tasks all require that the computer fully understands the semantic information of images and texts, and can translate the semantic information of one kind of module data to another module through learning. Therefore, the core problem of this kind of tasks is how to make up the gap between the two different modules at the semantic level, and find the way to communicate the data with two kinds of modules. The data of different modules exist in the heterogeneous space, so it is impossible to measure the semantic similarity directly by calculating the distance between the data. To solve this problem, the current mainstream method is to transform the two kinds of data to obtain isomorphic features, thereby embedding the data into a common space, so that they can be directly compared. Researchers have done a lot of work on which features are used to represent the data and which methods are used to embed the data in a common space.

Considering that some features derived from deep learning have achieved good results in many tasks in the field of computer vision, a large number of researchers use these features to represent images or text and transform them into isomorphic forms, so that the data can be mapped to a common space to complete the image-text retrieval task. However, these learned features only provide information at the global level of data and lack the description of local information. Therefore, by using only these features to represent data, it is impossible to mine the association between more fine-grained data, such as the association relationship between the region of the image and the phrase in the text. In another method, the image and text are divided into small parts, and mapped into a common space, so as to capture local semantic association information in fine-grained data.

Although the above methods have achieved good performance in some aspects, it is impossible to obtain a complete association relationship between the data with two kinds of modal by observing the semantic association from a single perspective, that is, a local perspective or a global perspective. Obtaining the semantic associations observed from the above two perspectives and using rationally can help to comprehensively understand the semantic information of the data and obtain accurate retrieval results. However, there is currently no way to obtain heterogeneous data associations from different perspectives at the same time, and to fuse these relationships to obtain the final semantic similarity between the data.

SUMMARY OF THE PRESENT INVENTION

To overcome the deficiencies of prior art, the present invention provides a bidirectional image-text retrieval method based on a multi-view joint embedding space, comprising: performing image-text retrieval with reference to the information at a global level and a local level, obtaining the semantic association relationship at the global level and the local level in a frame-sentence view and a region-phrase view, respectively, and then merging two semantic association relationships, so as to obtain an accurate semantic understanding.

The principle of the present invention is described below. Existing methods for acquiring and understanding semantic information of image and text have achieved good performance in some aspects, but it is impossible for the existing method of observing semantic associations from a single perspective to obtain a complete association relationship between the data with two kinds of modules. The present invention completes the image-text retrieval task by combining the information at the global level and the local level, that is, merging the semantic association obtained from the above two perspectives, to obtain more comprehensive and accurate semantic association relationship, which helps to comprehensively understand the semantic information of the data and obtain accurate retrieval results. In the present invention, the multi-view joint spatial learning framework is divided into three parts: a frame-sentence embedding module, a region-phrase embedding module, and a multi-view merge module. In the frame-sentence view embedding module, a complete sentence in a frame of picture or text is regarded as a basic unit, to obtain semantic information-rich features of data with two kinds of modal (i.e., image data and text data) through existing pre-trained models, and learn the isomorphic features of two sets of features by using a dual-branch neural network. With these feature vectors, the image and text data can be mapped into a common space. At the same time, during training of the dual-branch neural network, it is necessary to maintain the original association relationship between the data, that is, semantic similarity, and then try to save this association in a subspace at the global level through a measurable distance. In the region-phrase view embedding module, each image and each sentence are respectively divided into regions and phrases, and then the features of the local data containing semantic information are extracted by using the existing feature extraction method, and sent to another branch neural network, to obtain isomorphic features that maintain semantic similarity and a local level subspace in which fine-grained data is embedded and the distances can be directly calculated, and facilitate the exploration of the association between these fine-grained data.

In these two modules, in order to embed heterogeneous data into a common space, a dual-branch neural network is used in both views, and one branch is used to process data with one modal to make it isomorphic for comparison of features. The neural network of each branch is composed of two fully connected layers. The dual-branch neural network in the two views has the same structure, but after training for different training data two neural networks can extract features for frame-sentence data and region-phrase data, respectively, and retain the semantic association relationship in different views. In the present invention, the inner product between the data vectors is used to calculate the distance, to represent the similarity between the data. During training, in order to save semantic association information, a series of constraints are used to ensure that semantically related data has more adjacent positions in this common space.

In the multi-view merge module, we calculate the distance between the image and the text data in the multi-view joint space by proportionally combining the distances calculated in the first two views. This final distance can more accurately show the semantic similarity between the data and can be used as a sorting basis for the retrieval task. It should be noted that in the process of retrieval task, the semantic association relationship of one view can be used to retrieve separately, and the semantic association relationship of multi-view merging can also be used for search. It can be seen in the subsequent experimental results that the semantic similarity obtained after multi-view merging can more accurately represent the semantic association relationship between data The technical scheme proposed in the present invention:

A bidirectional image-text retrieval method based on a multi-view joint embedding space, performing bidirectional image-text retrieval with reference to the information at a global level and a local level; for data set D={$D_1, D_2, \ldots, D_{|D|}$}, each document $D_i$ in the data set includes an image $I_i$ and a related piece of text $T_i$, $D_i=(I_i, T_i)$, each piece of text consists of multiple sentences, and each sentence independently describes the matching image; in the frame-sentence view, $f_i$ is set to represent an image of the training image $I_i$, {$s_{i1}, s_{i2}, \ldots, s_{ik}$} represents the sentence set in $T_i$, k is the number of sentences in text $T_i$; in region-phrase view, $r_{im}$ is set to represent the $m^{th}$ region extracted from frame $f_i$, $p_{in}$ represents the $n^{th}$ phrase extracted from the sentence in text $T_i$; and in the method of the present invention, firstly data is observed from the frame-sentence view and the region-phrase view, respectively to obtain the semantic association relationship at the global level and the local level, and then an accurate semantic understanding is obtained through the merging of the two semantic associations; specifically, comprising one or more of the following steps:

1) extracting the frames of all images and the sentences in all texts separately, and extracting the CNN (Convolutional Neural Network) features of the frame data by using the existing 19-layer VGG (Neural Network Structure) model, and extracting the FV (Fisher vector) features of sentence data by using the existing Hybrid Gaussian-Laplace Mixture Model (HGLMM);

2) sending the two sets of features (CNN features and FV features) obtained in Step 1 respectively into two branches of the dual-branch neural network, and obtaining the isomorphic features of the frame and sentence data through training. At this time, the frames and sentences are mapped to the global level subspace, and semantic association information of image and text data in the frame-sentence view is obtained;

3) extracting the region RCNN features of all frames by using the existing Faster RCNN (Faster Region-based Convolutional Network) model, and extracting the dependency triplet of phrases of all sentences by using the existing Standford CoreNLP parser, while retaining the region and phrase features of key information;

4) sending the two sets of features (RCNN features and dependency triplet of phrases) obtained in Step 3 respectively into two branches of another dual-branch neural network, and obtaining the isomorphic features of the region and phrase data through training. At this time, the regions and phrases are mapped to the local level subspace, and semantic association information of image and text data in the region-phrase view is obtained;

5) merging semantic association information of the image and the text data in different views obtained in Step 2 and Step 4 by means of merging and sorting method, to calculate the multi-view distance between the image and the text data in the multi-view joint space, which is used to measure semantic similarity as a sorting criterion in the retrieval process; and 6) calculating the distance between the retrieval request data in the multi-view joint space and the other modal data (image or text) in the data set D for the retrieval request (that is, the multi-view distance between the image and the text data in the multi-view joint space), and sorting the retrieval results according to the distance.

A bidirectional image-text retrieval method based on a multi-view joint embedding space is realized.

Compared with the prior art, the presently disclosed method may include the following benefits:

The present invention discloses a bidirectional image-text retrieval method based on a multi-view joint embedding space, which realizes a bi-directional image-text retrieval task by learning to obtain a multi-view joint embedding space. In this method, the data is observed by utilizing different views, obtaining the semantic association relationship of the data under different granularities, and merging by means of a multi-view merging and sorting method, to obtain more accurate semantic associations and a more accurate retrieval result. Specifically, the present invention uses a dual-branch neural network to map image and text data to the global level subspace of frame-sentence view and the local level subspace of region-phrase view respectively, to obtain the semantic association relationship at the global level and the local level. Based on the two sets of semantic association relationships, the bidirectional image-text retrieval task can be completed separately, but the obtained retrieval result is incomplete. The present invention proposes a multi-view merging and sorting method, which fuses the semantic association relationships in the two views, and jointly calculates the distance between the data in the multi-view joint space. The obtained distance relationship between the data can represent the semantic similarity of the data more accurately, so as to obtain a more accurate retrieval result. Specifically, the present invention has the following technical advantages:

I. In the present invention, the high-level semantic association relationship between data in different modules is observed from multiple views, and these association relationships are merged to form a multi-view semantic association relationship, which is not considered in the existing image-text retrieval method; and with the method of the present invention, we can learn the semantic information of the data at different granularities, thereby effectively extracting more accurate semantic information and obtaining a more accurate retrieval result;

II. The present invention can merge semantic association relationships in different views by means of a merging and sorting method, so that the relative distance of the data in the multi-view joint space can well synthesize the semantic relations in different views, to obtain an accurate semantic similarity between data;

III. The present invention adopts a dual-branch neural network. The data of different modules are heterogeneous, and it is impossible to directly compare or calculate the distance. In the dual-branch neural network, each branch processes the data of one module, and transforms the data of different modules into isomorphic features, so that the heterogeneous data exists in a common space at the same time, and the distance can be directly calculated; and IV. The present invention adopts a series of constraints. In order to obtain the isomorphic features, the data is transformed by the dual-branch neural network, but the original semantic association relationship of the data needs to be retained during conversion; and the interval-based random loss function is adopted to separate the distance between the semantically related data and the distance between the semantically unrelated data, to ensure that the semantic similarity information between the data in the common space is reserved.

BRIEF DESCRIPTION OF THE DRAWINGS

Where VGG is a 19-layer VGG model, extracting the CNN features of the frame, HGLMM is the Fisher Vector feature of sentence extracted by the Hybrid Gaussian-Laplacian Mixture Model, RCNN is the RCNN feature of the region extracted by using Faster RCNN model, and Parser is a dependency triplet of the extracted phrases by Standford CoreNLP parser. The neural network consists of two fully connected layers, and the two neural networks in each view form a dual-branch neural network.

where, (a) is the inter-modal consistency, and (b) is the intra-modal consistency.

DETAILED DESCRIPTION OF THE PRESENT INVENTION

The present invention will become apparent from the following detailed description of embodiments and from the accompanying drawings, but not limited to the scope of the present invention in any way.

The present invention discloses a bidirectional image-text retrieval method based on a multi-view joint embedding space, comprising performing retrieval with reference to a semantic association relationship at a global level and a local level; obtaining the semantic association relationship at the global level and the local level in a frame-sentence view and a region-phrase view, respectively, embedding the image and the sentence in the subspace of the global level, and then obtaining from the semantic association information of frame-sentence view; extracting each region of the image and each phrase of sentence in the region-phrase view and embedding in the subspace of the local level to obtain the semantic association information of the region and the phrase; processing data by a dual-branch neural network in the two views to obtain an isomorphic feature, embedding the same in a common space, and using a constraint condition to reserve an original semantic relationship of the data during training; and merging two semantic association relationships by means of a multi-view merging and sorting method to obtain an more accurate semantic similarity between data.

We use the data set $D=\{D_1, D_2, \ldots, D_{|D|}\}$ to describe the image-text retrieval problem. In this data set, each document includes a image and a related piece of text, e.g., $D_i=(I_i, T_i)$. Each text consists of several sentences, each of which independently describes the matching image. In the frame-sentence view, we use $f_i$ to represent an image of the training image $I_i$, and $\{s_{i1}, s_{i2}, \ldots, s_{ik}\}$ to represent the set of sentences in $T_i$ (k is the number of sentences in text $T_i$). In the region-phrase view, we use $r_{im}$ to represent the $m^{th}$ region extracted from the frame $f_i$, and $p_{in}$ to represent the $n^{th}$ phrase extracted from the sentence in text $T_i$. Next we will describe in detail the constraints used in the two views, and the merging and sorting method of the final multi-view merge module.

1. Frame-Sentence View

Figure 2:
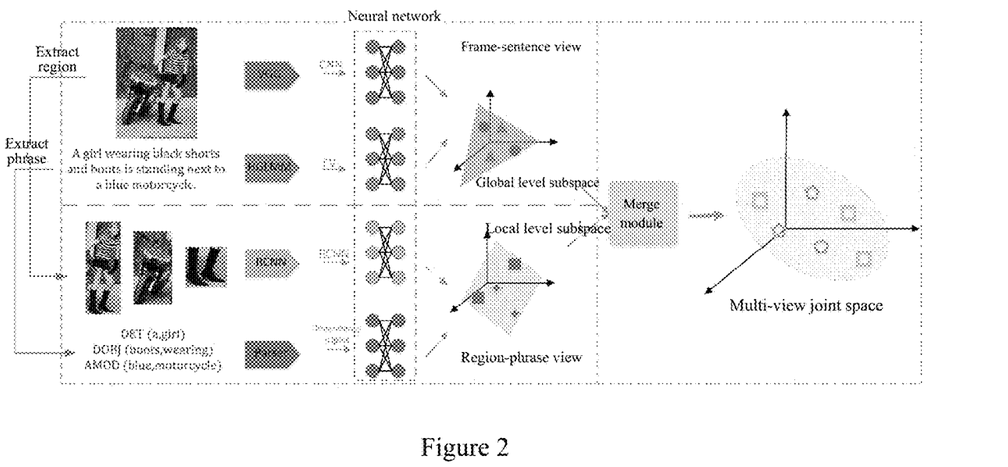
FIG. 2 is a schematic diagram of learning process in a multi-view joint embedding space in an embodiment of the present invention.

We send the frames and sentences into the dual-branch neural network separately, and obtain the isomorphic features of the subspace at the global level. In the process of training the neural network, in order to reserve the inter-modal consistency and the intra-modal consistency, we propose the interval-based random loss function. In order to put the data into the frame-sentence view for processing, we make the following feature extraction:

For the image, we use the 4,096-dimensional CNN feature (vector) extracted by the 19-layer VGG model as the original feature of the frame; and for the text, we use the Hybrid Gaussian-Laplacian Mixture Model (HGLMM) to extract the Fisher Vector (FV) feature vector as the original feature of the sentence. For convenient calculation, we use PCA (Principal Components Analysis) to reduce the initial 18,000-dimension FV feature vector to 4,999-dimension FV feature vector.

1) Inter-Modal Consistency

Figure 3:
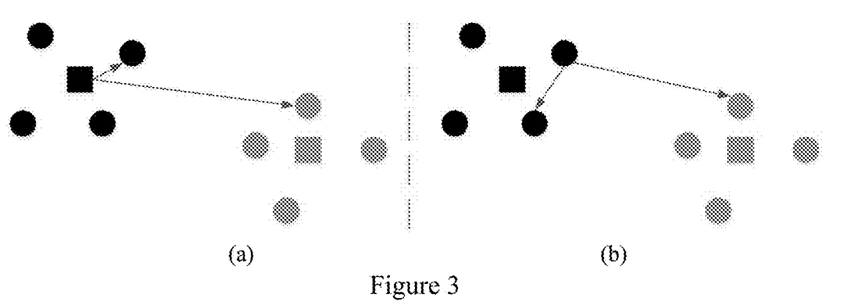
FIG. 3 is a schematic diagram of the inter-modal consistency and the intra-modal consistency.

For the training frame $f_i$, all sentences can be divided into two sets. One set contains all sentences matching the training frame, and the other set contains all sentences that do not match the training frame. We can infer a reasonable consistency requirement. In the frame-sentence view, the distance between the frame $f_i$ and the sentence in the matching set must be smaller than the distance between the frame $f_i$ and the sentence in the non-matching set, and the distance difference shall be larger than the interval m. The mathematical representation is as shown in Formula (1):

$$d(f_i, s_{ix})+m<d(f_i, s_{jy}) \text{ if } i\neq j \qquad (1)$$

Where $d(f_i, s_{ix})$ represents the distance between the frame $f_i$ and the sentence $s_{ix}$ in the matching set; and $d(f_i, s_{jy})$ represents the distance between the frame $f_i$ and the sentence $s_{jy}$ in the non-matching set.

Similar constraints can be applied to the training sentence $s_{ix}$:

$$d(f_i, s_{ix})+m<d(f_j, s_{ix}) \text{ if } i\neq j \qquad (2)$$

Where $d(f_i, s_{ix})$ represents the distance between the sentence $s_{ix}$ and the frame $f_i$ in the matching set; and $d(f_j, s_{ix})$ represents the distance between sentence $s_{ix}$ and the frame f in the non-matching set.

2) Intra-Modal Consistency

In the training process, in addition to considering the inter-modal consistency, we also need to make some constraints on the sentences accompanying the same frame in the data set. We call it intra-modal consistency. Specifically, sentences sharing the same meaning, that is, sentences that describe the same frame, need to be closely linked and can be distinguished from other sentences.

To achieve intra-modal consistency, we use the following constraints:

$$d(s_{ix},s_{iy})+m<d(s_{ix},s_{jz}) \text{ if } i\neq j \quad (3)$$

where $d(s_{ix}, s_{iy})$ represents the distance between the sentence $s_{ix}$ and $s_{iy}$ in the same frame $f_i$; and $d(s_{ix}, s_{jz})$ represents the distance between the sentence $s_{ix}$ of frame $f_i$ and the sentence $s_{jz}$ of frame $f_j$.

Although we should make a constraint similar to Formula (3) on the frame, that is, the distance between the frames describing the same sentence should be closer, in the data set we use now, it is difficult to determine whether several frames describe the same sentence, so we do not use this constraint, but only the distance between the sentences describing the same frame is constrained by Formula (3).

Combined with the above constraints, we finally summarize the loss function in the frame-sentence view:

$$\psi_{frame-sentence} = \sum_{i,j,x,y} \max[0, m + d(f_i, s_{ix}) - d(f_i, s_{jy})] + \lambda_1 \sum_{i,j,x} \max[0, m + d(f_i, s_{ix}) - d(f_j, s_{ix})] + \lambda_2 \sum_{i,j,x,y,z} \max[0, m + d(s_{ix}, s_{iy}) - d(s_{ix}, s_{jz})] \quad (4)$$

Where, the interval m can be adjusted according to the distance used. For convenient optimization, we fixed it here as m=0.1 and applied it to all training samples. At the same time, through experiment we found that when $\lambda_1=2$ and $\lambda_2=0.2$ we could get the best experimental results.

2, Region-Phrase View

In this view, we want to mine the fine-grained semantic association relationship between regions and phrases. We extract the region and phrase features by using the existing model. For the regions, we extract the 4,096-dimension RCNN feature in 19 regions with the highest scores in the frame; and for the phrases, we use a parser to get the dependency tree structure and select the phrase containing the key semantic information. We use the 1-of-k encoding vector w to represent each word and map $p_{jy}$ into the embedded space by using the phrase represented by dependency triple (R, $w_1$, $w_2$), as in Formula (5):

$$p_{jy} = f\left(W_R \begin{bmatrix} W_e w_1 \\ W_e w_2 \end{bmatrix} + b_R\right) \quad (5)$$

Where $W_e$ is a matrix of 400,000×d, which is used to encode the 1-of-k vector into a d-dimension word vector, where 400,000 is the number of words in the dictionary. Here we set d=200. Note that each relationship R has a separate weight $W_R$ and an offset $b_R$, and the number of phrases extracted in different sentence is different.

In this view, we use a dual-branch neural network to map image and text data into the local subspace of the region-phrase view. In the process of training the network, we require that the distance between the region and the phrase in the matching image text pair is smaller than the distance between the region and the phrase in the non-matching pair. The loss function to map the data in this view to the local level subspace is expressed as follows:

$$\psi_{region-phrase} = \sum_{i,j,x,y} \kappa_{ij} \max[0, 1-\eta_{ij} \times d(r_{ix}, p_{jy})] \quad (6)$$

Where $d(r_{ix}, p_{jy})$ represents the distance between the region $r_{ix}$ and phrase $p_{jy}$. We define that $\eta_{ij}$ is equal to +1 when i=j, and equal to −1 when i≠j, and the constant $\kappa_{ij}$ is used for normalization based on the positive and negative numbers of $\eta_{ij}$.

3. Multi-View Merge Module

After the frame-sentence embedding module and the region-phrase embedding module respectively learn the respective embedding spaces, we can use the information in the two spaces to obtain the inter-data distance in the multi-view. In order to obtain more accurate semantic similarity between image $I_i$ and text $T_j$, we proportionally combine the distances calculated in the first two views as the final distance between two data in the multi-view joint space:

$$d_{multi-view}(I_i, T_j) = d_{frame-sentence}(I_i, T_j) + \lambda d_{region-phrase}(I_i, T_j) \quad (7)$$

Where $d_{frame-sentence}(I_i, T_j)$ represents the distance between image $I_i$ and text $T_j$ in the frame-sentence view, $d_{region-phrase}(I_i, T_j)$ represents the distance between image $I_i$ and text $T_j$ in region-phrase view, and $d_{multi-view}(I_i, T_j)$ represents the distance between image $I_i$ and text $T_j$ after multi-view merging. The weight is used to balance the ratio of the distance in frame-sentence view and region-phrase view. After experiment, we found that good results could be obtained with $\lambda=0.6$.

Figure 1:
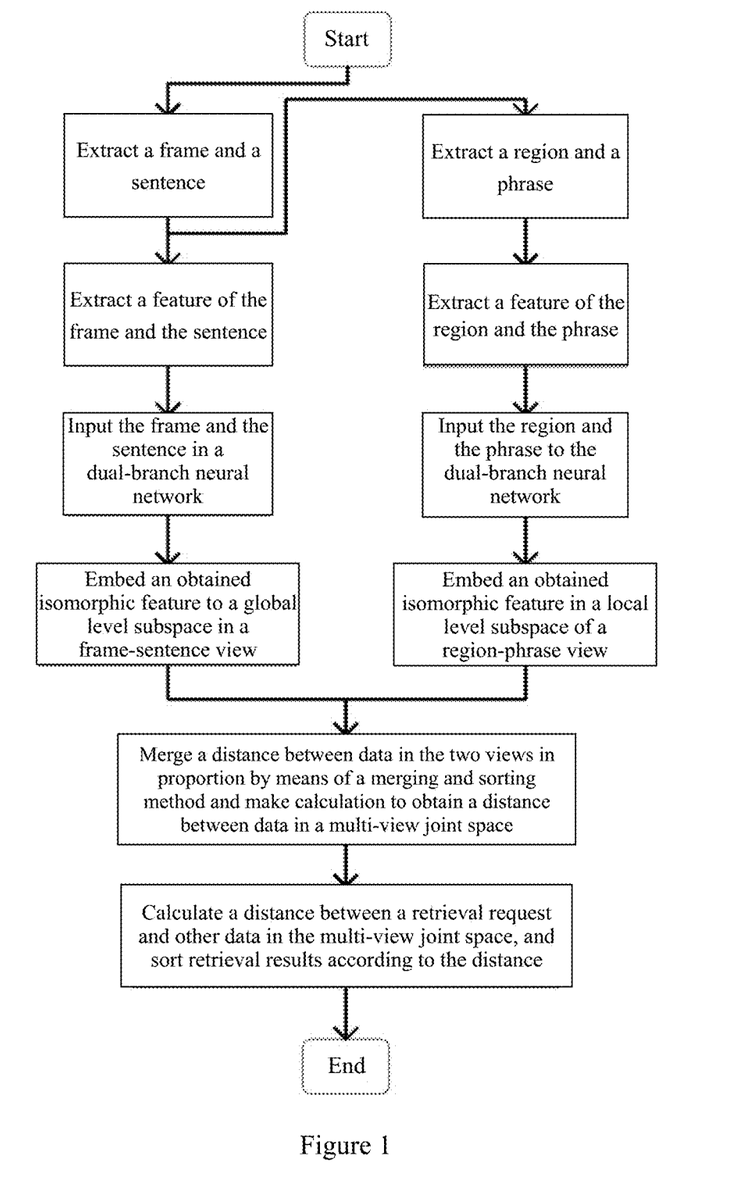
FIG. 1 is a flow chart of bidirectional image-text retrieval method based on a multi-view joint embedding space in the present invention.

FIG. 1 is a flow chart of multi-view joint embedded spatial learning framework.

FIG. 2 shows a schematic diagram of the learning framework proposed in the present invention. The framework is divided into three parts. In the frame-sentence view, we embed frames and sentences into the subspace of global level. In the region-phrase view, we extract small components in the frame and the sentence, and these components are embedded in the subspace of the local level. In each view, we use a dual-branch neural network to process the data, so that they become isomorphic features embedded in the common space. In the multi-view merge module, a multi-view merging and sorting method is proposed to fuse the semantic association information obtained by analysis of two views to obtain the final distance relationship between the data.

FIG. 3 shows a schematic diagram of inter-modal consistency (left) and intra-modal consistency (right) in the frame-sentence view. Squares represent images, circles represent sentences, and frames of the same color represent the same semantic information. The inter-modal consistency means that in the frame-sentence view the distance between a frame (black square) and the sentences (black circles) it matches must be smaller than the distance between the image (black square) and the sentences that does not match it (gray circles), and this constraint applies equally to sentences. The intra-modal consistency means that in the frame-sentence view the distance between a sentence (black square) and a sentence (other black squares) that is semantically similar in the frame-sentence view must be smaller than the distance between the sentence (black square) and the sentence (grey squares) unrelated to its semantics.

Figure 4:
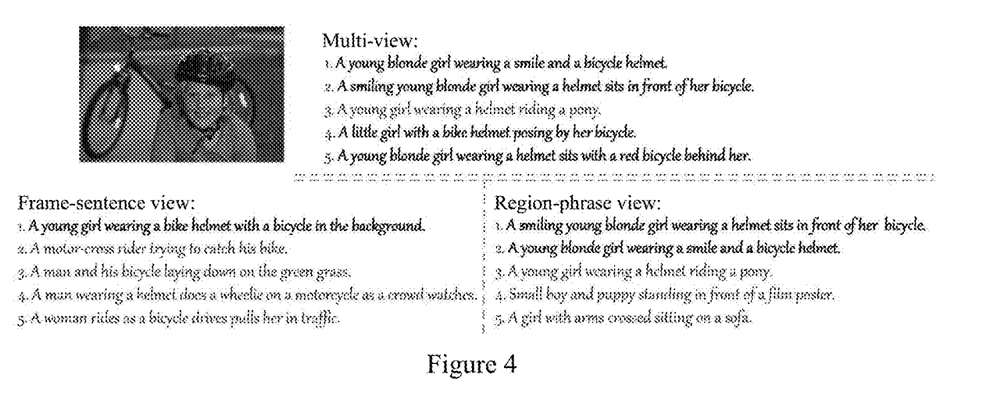
FIG. 4 is an image-text retrieval result obtained by using the method of the present invention under Pascal 1K data set according to an embodiment of the present invention.

FIG. 4 shows an actual case of image-text retrieval, which gives the retrieval results of the first five sentences returned for the upper left image in the frame-sentence view, the region-phrase view and the multi-view. Correct retrieval results are indicated in bold. In this example, we can see that in the frame-sentence view only sentences that are understood at the global level can be retrieved. Since it cannot distinguish the content in the region, correctly matched sentences are confused with sentences that have similar meaning but include incorrect individuals. In the region-phrase view, it returns some sentences that contain the correct individuals but the relationships between the individuals are inaccurate. For example, the third sentence in this view can identify 'a young girl', but it misunderstands that the relationship between the girl and the bicycle is 'riding', and finally returns a wrong sentence. But in the merged multi-view, it can capture the semantic association relationship at the global level and the semantic association relationship at the local level at the same time, so the multi-view retrieval effect is the most accurate.

TABLE 1

Bidirectional image-text retrieval results in Pascal1K data set in the present embodiment

| | Pascal1K | | | | | |
|---|---|---|---|---|---|---|
| | Image-text retrieval | | | Text-image retrieval | | |
| Method | R@1 | R@5 | R@10 | R@1 | R@5 | R@10 |
| Randomly sorted | 4.0 | 9.0 | 12.0 | 1.6 | 5.2 | 10.6 |
| SDT-RNN | 23.0 | 45.0 | 63.0 | 16.4 | 46.6 | 65.6 |
| kCCA | 21.0 | 47.0 | 61.0 | 16.4 | 41.4 | 58.0 |
| DeViSE | 17.0 | 57.0 | 68.0 | 21.0 | 54.6 | 72.4 |
| DCCA | — | — | — | — | — | — |
| VQA-A | — | — | — | — | — | — |
| DFE | 39.0 | 68.0 | 79.0 | 23.6 | 65.2 | 79.8 |
| Present invention (only frame-sentence view) | 30.0 | 62.0 | 76.0 | 21.8 | 65.2 | 83.2 |
| Present invention (only region-phrase view) | 35.0 | 67.0 | 86.0 | 29.4 | 67.8 | 82.6 |
| Present invention (multi-view) | 47.0 | 83.0 | 93.0 | 29.0 | 73.4 | 87.0 |

TABLE 2

Bidirectional image-text retrieval results in Flickr8K data set in the present embodiment

| | Flickr8K | | | | | |
|---|---|---|---|---|---|---|
| | Image-text retrieval | | | Text-image retrieval | | |
| Method | R@1 | R@5 | R@10 | R@1 | R@5 | R@10 |
| Randomly sorted | 0.1 | 0.6 | 1.1 | 0.1 | 0.5 | 1.0 |
| SDT-RNN | 4.5 | 18.0 | 28.6 | 6.1 | 18.5 | 29.0 |
| kCCA | — | — | — | — | — | — |
| DeViSE | 4.8 | 16.5 | 27.3 | 5.9 | 20.1 | 29.6 |
| DCCA | 28.2 | 56.1 | 69.8 | 26.3 | 54.0 | 67.5 |
| VQA-A | 24.3 | 52.2 | 65.2 | 17.2 | 42.8 | 57.2 |
| DFE | 12.6 | 32.9 | 44.0 | 9.7 | 29.6 | 42.5 |
| Present invention (only frame-sentence view) | 20.7 | 43.7 | 57.4 | 15.8 | 32.7 | 47.4 |
| Present invention (only region-phrase view) | 17.6 | 39.8 | 49.0 | 12.5 | 30.1 | 48.6 |
| Present invention (multi-view) | 24.5 | 60.2 | 73.5 | 18.9 | 48.9 | 68.2 |

What is claimed is:

1. A bidirectional image-text retrieval method based on a multi-view joint embedding space, comprising:
    performing bidirectional image-text retrieval with reference to semantic association relationship at a global level and a local level; for a data set $D=\{D_1, D_2, \ldots, D_{|D|}\}$, wherein each document $D_t$ in the data set includes an image $I_t$ and a related piece of text $T_t$, expressed as $D_t=(I_t, T_t)$, each piece of text including multiple sentences, wherein each sentence independently describing the matching image;
    in a frame-sentence view based on joint embedding of features extracted from a frame and one or more sentences, setting $f_i$ to represent an image of the training image $I_i$, wherein $\{s_{i1}, s_{i2}, \ldots, s_{ik}\}$ represents the sentence set in $T_i$, k is a number of sentences in text $T_i$;
    in a region-phrase view based on joint embedding of features extracted from a region and one or more phrase, setting $r_{im}$ is set to represent the $m^{th}$ region extracted from frame $f_i$, $p_{in}$ to represent the $n^{th}$ phrase extracted from the sentence in text $T_i$; and
    in the said bidirectional retrieval method, obtaining firstly the semantic association relationship at the global level and the local level in the frame-sentence view and the region-phrase view, respectively, and then obtaining semantic understanding by merging the semantic association relationships;
    the method further comprising:
    1) extracting frames of images and sentences in texts separately, sending the images and the sentences into a model to extract the features of the data, and extracting CNN features of the frame and FV features of the sentence;
    2) sending the CNN features of the frame and the FV features of the sentence obtained in Step 1) respectively into two branches of a dual-branch neural network, and obtaining isomorphic features of the frame and sentence data through training, mapping the frames and the sentences to the global level subspace, and obtaining semantic association information of image and text data in the frame-sentence view;
    3) extracting region RCNN features of all frames by using a RCNN model, and extracting a dependency triplet of phrases of all sentences by using a parser, while retaining the region and phrase features with key information;
    4) sending the features of the region and the phrase obtained in Step 3) respectively into two branches of another dual-branch neural network, and obtaining isomorphic features of the region and phrase data through training, mapping regions and phrases to the local level subspace, and obtaining semantic association information of image and text data in the region-phrase view;
    5) merging semantic association information of the image and the text data in different views obtained in Step 2) and Step 4) by means of merging and sorting method, to calculate a multi-view distance between the image and the text data in a multi-view joint space, which is used to measure semantic similarity as a sorting criterion in the retrieval process; and
    6) calculating distances between retrieval request data and modal data in the data set in the multi-view joint space for a retrieval request, and sorting retrieval results according to the distances.

2. A bidirectional image-text retrieval method according to claim 1, wherein in Step 1), for the image, a 4,096-dimensional CNN feature vector extracted by a 19-layer VGG model is used as a original feature of the frame; and for the text, a Hybrid Gaussian-Laplacian Mixture Model (HGLMM) is used to extract a FV feature vector as an original feature of the sentence, wherein Principal Components Analysis is used to reduce the 18,000-dimensional feature vector to 4,999-dimension.

3. A bidirectional image-text retrieval method according to claim 1, wherein in Step 2), the features are sent into two brands of the dual-branch neural network separately for training, and the isomorphic features of the image and the sentence data are obtained, wherein constraints are set in the process of training to reserve the inter-modal consistency and the intra-modal consistency, and an interval-based random loss function is adopted, the method further comprising:

A. training frame $f_i$: dividing all sentences into the matching set and the non-matching set, wherein matching set contains all sentences matching the training frames, wherein the non-matching set contains all the sentences that do not match the training frames, wherein the consistency constraint requirements include: in the frame-sentence view, the distance between the frame $f_i$ and the sentence in the matching set must be smaller than the distance between the frame $f_i$ and the sentence in the non-matching set, and the distance difference shall be larger than an interval m, wherein a mathematical representation is as shown in Formula (1):

$$d(f_i, s_{ix}) + m < d(f_i, s_{jy}) \text{ if } i \neq j \tag{1}$$

where $d(f_i, s_{ix})$ represents the distance between the frame $f_i$ and the sentence $s_{ix}$ in the matching set; and $d(f_i, s_{jy})$ represents the distance between the frame $f_i$ and the sentence $s_{jy}$ in the non-matching set;

B. applying the constraints in Formula (2) to the training sentence $s_{ix}$:

$$d(f_i, s_{ix}) + m < d(f_j, s_{ix}) \text{ if } i \neq j \tag{2}$$

where $d(f_i, s_{ix})$ represents the distance between the sentence $s_{ix}$ and the frame $f_i$ in the matching set; and $d(f_j, s_{ix})$ represents the distance between sentence $s_{ix}$ and the frame $f_j$ in the non-matching set;

C. setting constraints for multiple sentences for the same frame in the data set, expressed as Formula (3):

$$d(s_{ix}, s_{iy}) + m < d(s_{ix}, s_{jz}) \text{ if } i \neq j \tag{3}$$

where $d(s_{ix}, s_{iy})$ represents the distance between the sentence $s_{ix}$ and $s_{iy}$ in the same frame $f_i$; and $d(s_{ix}, s_{jz})$ represents the distance between the sentence $s_{ix}$ of frame $f_i$ and the sentence $s_{jz}$ of frame $f_j$;

D. defining the loss function established in the frame-sentence view by Formula (4):

$$\psi_{frame-sentence} = \sum_{i,j,x,y} \max[0, m + d(f_i, s_{ix}) - d(f_i, s_{jy})] + \lambda_1 \sum_{i,j,x} \max[0, m + d(f_i, s_{ix}) - d(f_j, s_{ix})] + \lambda_2 \sum_{i,j,x,y,z} \max[0, m + d(s_{ix}, s_{iy}) - d(s_{ix}, s_{jz})] \tag{4}$$

where the interval m is adjusted according to the distance used.

4. A bidirectional image-text retrieval method according to claim 3, wherein the interval $\lambda = 0.1$, $\lambda_1 = 2$, and $\lambda_2 = 0.2$.

5. A bidirectional image-text retrieval method according to claim 1, wherein in Step 3), the region and phrase features are extracted by using the model:

for the regions, the 4,096-dimension RCNN features in 19 regions with the highest scores in the frame are extracted; and for the phrases, a parser is used to get the dependency tree structure and the phrase containing the key semantic information is selected, wherein the 1-of-k encoding vector w is used to represent each word and map $p_{jy}$ into the embedded space by using the phrase represented by dependency triple (R, $w_1$, $w_2$), as in Formula (5):

$$p_{jy} = f\left(W_R \begin{bmatrix} W_e w_1 \\ W_e w_2 \end{bmatrix} + b_R\right) \tag{5}$$

where $W_e$ is a matrix of 400,000×d, which is used to encode the 1-of-k vector into a d-dimension word vector, where 400,000 is a number of words in the dictionary, wherein each relationship R has a separate weight $W_R$ and an offset $b_R$, and a number of phrases extracted in different sentence is different.

6. A bidirectional image-text retrieval method according to claim 1, wherein in Step 4), the features of the region and the phrase are respectively sent into two branches of the dual-branch neural network, and the isomorphic features of the region and phrase data are obtained through training, wherein in a training process, the setting condition is that the distance between the region and the phrase in the matching image text pair is smaller than the distance between the region and phrase in the non-matching set, wherein a loss function in Formula (6) is used to calculate the data in the region-phrase view and mapped to the local level subspace:

$$\psi_{region-phrase} = \Sigma_{i,j,x,y} \kappa_{ij} \max[0, 1 - \eta_{ij} \times d(r_{ix}, p_{jy})] \tag{6}$$

where $d(r_{ix}, p_{jy})$ represents the distance between the region $r_{ix}$ and phrase $p_{jy}$, $\eta_{ij}$ is equal to +1 when i=j, and equal to −1 when i≠j, and the constant $\kappa_{ij}$ is used for normalization based on the positive and negative numbers of $\eta_{ij}$.

7. A bidirectional image-text retrieval method according to claim 1, wherein in Step 5), distances calculated in the two views are proportionally combined as a distance between two data in the multi-view joint space, as expressed as Formula (7):

$$d_{multi-view}(I_i, T_j) = d_{frame-sentence}(I_i, T_j) + \lambda d_{region-phrase}(I_i, T_j) \tag{7}$$

where $d_{frame-sentence}(I_i, T_j)$ represents the distance between image $I_i$ and text $T_j$ in the frame-sentence view, $d_{region-phrase}(I_i, T_j)$ represents the distance between image $I_i$ and text $T_j$ in region-phrase view, and $d_{multi-view}(I_i, T_j)$ represents the distance between image $I_i$ and text $T_j$ after multi-view merging; and a weight $\lambda$ used to balance the ratio of the distance in frame-sentence view and region-phrase view.

8. A bidirectional image-text retrieval method according to claim 7, wherein the weight $\lambda = 0.6$.

* * * * *